United States Patent
Tavallaei et al.

[19]

[11] Patent Number: 5,938,751
[45] Date of Patent: Aug. 17, 1999

[54] BUS RING-BACK AND VOLTAGE OVER-SHOOT REDUCTION TECHNIQUES COUPLED WITH HOT-PLUGGABILITY

[75] Inventors: Siamak Tavallaei, Spring; Joseph P. Miller, Cypress, both of Tex.

[73] Assignee: Compaq Computer Corporation, Houston, Tex.

[21] Appl. No.: 08/912,092

[22] Filed: Aug. 15, 1997

[51] Int. Cl.⁶ .................................................... G06F 13/00
[52] U.S. Cl. .......................... 710/103; 710/129; 713/300
[58] Field of Search ..................................... 395/281, 282, 395/283, 306, 307, 308, 309, 311, 750.01; 323/238; 307/139; 710/100–103, 126–129, 131, 300

[56] References Cited

U.S. PATENT DOCUMENTS

| | | | |
|---|---|---|---|
| 5,376,831 | 12/1994 | Chen et al. | 327/379 |
| 5,384,492 | 1/1995 | Carlson et al. | 307/147 |
| 5,526,289 | 6/1996 | Dinh et al. | 364/557 |
| 5,572,395 | 11/1996 | Rasums et al. | 361/58 |
| 5,572,685 | 11/1996 | Fisher et al. | 395/287 |
| 5,574,667 | 11/1996 | Dinh et al. | 364/557 |
| 5,594,873 | 1/1997 | Garrett | 395/283 |
| 5,631,800 | 5/1997 | Jin et al. | 361/103 |
| 5,634,038 | 5/1997 | Saitoh | 395/490 |
| 5,638,895 | 6/1997 | Dodson | 165/121 |
| 5,698,973 | 12/1997 | Goerke et al. | 323/901 |
| 5,714,809 | 2/1998 | Clemo | 395/283 |
| 5,726,506 | 3/1998 | Wood | 395/283 |
| 5,748,912 | 5/1998 | Lee | 395/283 |
| 5,754,797 | 5/1998 | Takahashi | 395/283 |
| 5,758,102 | 5/1998 | Carey et al. | 395/283 |
| 5,764,924 | 6/1998 | Hong | 395/281 |
| 5,764,926 | 6/1998 | Fukuda et al. | 395/283 |
| 5,774,315 | 6/1998 | Mussenden | 361/18 |
| 5,774,706 | 6/1998 | Neal et al. | 395/282 |
| 5,784,576 | 7/1998 | Guthrie et al. | 395/283 |
| 5,787,261 | 7/1998 | Osaka et al. | 395/283 |
| 5,793,987 | 8/1998 | Quackenbush et al. | 395/283 |
| 5,796,185 | 8/1998 | Takata et al. | 307/140 |
| 5,809,256 | 9/1998 | Najemy | 395/283 |
| 5,815,647 | 9/1998 | Buckland et al. | 395/283 |

OTHER PUBLICATIONS

"CMOS Bus Switches Provide Zero Delay Bus Communication" Application Note AN–09; Quality Semiconductor Inc.; date unknown; pp. 1–9.

"High–Performance CMOS Analog 8–Channel Switch" QS4A05Q Preliminary; Quality Semiconductor Inc.; May 30, 1996; pp. 1–7.

"Quickswitch® Converts TTL Logic to Hot Plug Operation" Application Note AN–13; Quality Semiconductor Inc., date unknown; pp. 1–5.

The I²C–Bus and how to use it (including specification); *Philips Semicnductor*; Apr. 1995; pp. 1/24.

"Remote 8–bit I/O expander for I²C–Bus" Data Sheet; *Philips Semiconductor*; Apr. 2,1997; pp. 1–23.

(List continued on next page.)

*Primary Examiner*—Ayaz R. Sheikh
*Assistant Examiner*—Xuan M. Thai
*Attorney, Agent, or Firm*—Jenkens & Gilchrist P.C.

[57] ABSTRACT

A bus ring-back and voltage over-shoot reduction apparatus with capability for rendering an expansion slot of a computer system hot-pluggable, wherein a logic gate controls a switching element so that when the element is turned on, the input and output (I/O) nodes of the element are in a low ohmic conductive relationship. One of the I/O nodes is coupled to an expansion card whereas the other node is coupled to a bus to which the expansion slot is connected. The apparatus operates as a level shifter wherein the output node voltage follows the input node voltage until pinch-off such that the output voltage remains substantially stable thereafter. The apparatus also isolates the expansion card from the bus when the system is running or during the powering up of the card.

12 Claims, 5 Drawing Sheets

OTHER PUBLICATIONS

Farnsworth, C.; "Low Power Implementation of an I²C–Bus Expander"; http://maveric0.uwaterloo.ca/amulet/publications/thesis farnsworth94_msc.html; Jun. 16, 1997; one page.

Collins, Andy; "Interfacing TMS370 Microcontrollers to I²C–Bus ICs"; Logikos; wysiwyg://lll/htp://www.logikos.com/tms370.html; Jun. 16, 1997; pp. 1–6.

"I²C Bus Expander" Application Note AN036; *Philips Semiconductors Programmable Logic Devices:* Oct., 1993; 22 pages.

"The PCI (Peripheral Component Interconnect) Bus"; Aug. 6, 1997; pci.txt at www.gl.umbc.edu; pp. 1–7.

Barton, Jim; "Re: What's the difference between locks and semaphores?"; (jmb@patton.wpd.sgi.com) Jan. 2, 1991; Adcessed Jun. 16, 1997; http://www.sgi.com/Archive/comp.sys.sgi/1991/Jan/0006.html.

"Internal Data Structures, 6.4.3 Semaphores" Basic Concepts; Accessed Jul. 11, 1997; http://linux.www.db.erau.edu/LPG/node47.html.

"The PCI Local Bus"; Accessed Jul. 27, 1 997; http://www.rns.com/whats new/wh pci.html.

"PCI Bus Technology" Information Brief; *IBM Personal Computing Solutions;* Accessed Jul. 27, 1997; http://www.us.pc.ibm.com/infobrf.ibpci.html.

"PCI164 Screamer Functional Diagram" Microway; Accessed Jul. 27, 1997, http://www.microway.com/block.html.

"The PCI (Peripheral Component Interconnect) Local Bus" description of PCI Bus; Accessed Jul. 27, 1997; http://www.sundance.com/pci.html.

BUS RING-BACK AND VOLTAGE OVER-SHOOT REDUCTION TECHNIQUES COUPLED WITH HOT-PLUGGABILITY

BACKGROUND OF THE INVENTION

1. Technical Field of the Invention

The present invention relates generally to developments in the field of computer systems and, more particularly, to improved signal transmission techniques in highly available systems by way of bus ring-back and voltage over-shoot reduction.

2. Description of Related Art

Networks serve the purpose of connecting many different personal computers (PC's), workstations, or terminals to each other, and to one or more host computers, printers, file servers etc., so that expensive computing assets, programs, files and other data may be shared among many users.

In a network utilizing a client/server architecture, the client (a personal computer or workstation) is the requesting machine and the server is the supplying machine, both of which may preferably be connected via the network, such as a local area network (LAN), wide area network (WAN) or metropolitan area network (MAN). This is in contrast to early network systems that utilized a mainframe with dedicated terminals.

In a client/server network, the client typically contains a user interface and may perform some or all of the application processing and, as mentioned above, can include a personal computer or workstation. The server in a client/server network can be a high-speed microcomputer or minicomputer and, in the case of a high-end server, can include multiple processors and mass data storage such as multiple CD-ROM drives and multiple hard drives, preferably with Redundant Array of Inexpensive Disk (RAID) protection. An exemplary server such as a database server maintains the databases and processes requests from the client to extract data from or update the database. An application server provides additional business processing for the clients. The network operating system (NOS) together with the database management system (DBMS) and transaction monitor (TP monitor) are responsible for the integrity and security of the server.

Client/server networks are widely used throughout many different industries and business organizations, especially where mission-critical applications requiring high performance are routinely launched. The mass storage and multi-processing capabilities provided by current client/server network systems (for example, the high-end servers) that run such applications permit a wide range of essential services and functions to be provided through their use.

As can be appreciated, many businesses are highly dependent upon the availability of their client/server network systems to permit essential network services and functions to be carried out. As client/server network systems become increasingly essential to the everyday operations of such businesses, additional steps need to been taken in the design and construction of the server in the client/server network system to ensure its continuous availability to the clients. That is to say, in the design and construction of a server, steps need to be taken to ensure that the server can be operated with little or no downtime.

It can be appreciated by those skilled in the art that high availability, reliability and serviceability are valuable design aspects in ensuring that a server is a "zero downtime" system that will operate with little or no downtime. The modularity of components within a server has been recognized as an important design consideration in ensuring that the downtime of a server will be minimized. Modules can be removed and examined for operability or other purposes much easier than permanently mounted fixtures within a server chassis. When various components of a server can be provided in a modular form, they can also be readily replaced to maintain the operational status of the server with minimal downtime.

Removable modular components may include disc drives and power supplies. As described above, the removability of modular components allows for better overall serviceability of the computer system which is a distinct advantage. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server was that of turning the power to the server off before any modular components or printed circuit boards were removed from or added to the chassis or support frame of the server. Recent innovations have centered around a highly desirable design goal of "hot-pluggability" which addresses the benefits derived from inserting and removing modular components and printed cards from the chassis of the server when the server is electrically connected and operational. It can be readily appreciated that modularization and hot-pluggability can have a significant bearing on the high availability aspect of a high-end server.

Hot-pluggable components may include storage or disc drives, drive cages, fans, power supplies, system I/O boards, control boards, processor boards, and other sub-assemblies. The ability to remove these constituent components without having to power down the server allows for better overall serviceability of the system, which is a distinct advantage to both the user and the maintenance technician.

Component redundancy has also been recognized as an important design consideration in ensuring that a server will operate with little or no downtime. Essentially, component redundancy is typically provided in a system to better ensure that at least one of the redundant components is operable, thereby minimizing the system downtime. With component redundancy, at least two components are provided that can perform the same function, such that if one of the components becomes faulty for some reason, the operation fails over to the redundant component. When at least one of the redundant components is operable, continued operation of the computer system is possible even if others of the redundant components fail. To further enhance reliability and serviceability, redundant components have been made hot-pluggable.

Dynamic reconfiguration of a server system can also be accomplished by providing upgradable modular components therein. As can be readily appreciated, this objective can be accomplished by the addition or substitution of components having different circuits, preferably updated or upgraded, disposed therewithin. When components are redundant and hot pluggable, reconfiguration of the server is often possible without taking the server offline.

Another important design aspect with respect to providing redundant and hot pluggable components in a server system is to ensure and maintain a safe working environment while the server is operating and being repaired or upgraded. Accordingly, when the system components are swapped or upgraded, the exposure of hot connectors and contacts must be kept to a minimum. It can be appreciated by those skilled in the art that further developments in this area would significantly enhance the reliability and serviceability aspects of a high-end server system.

To further enhance the serviceability of server systems, additional innovations may be required in the design and construction of diagnostic sub-systems thereof. In existing client/server network systems it is often difficult to obtain in a timely manner important diagnostic data and information corresponding to a component failure in order to facilitate the quick serviceability of the server. Therefore, it can be appreciated that the more information that can be readily provided to locate a defective component or problem with the server, the better is the optimization of the amount of time the server is up and running.

It should be readily understood that the aspects of high availability, reliability and serviceability of computer systems are, at least in part, inter-related to the performance of such systems. For example, a poorly performing system is less likely to be highly available or reliable because such poor performance may typically result in persistent malfunctioning. As is known in the art, a significant performance bottle-neck in many current computer systems can be the ease and speed with which transmission signals settle on a conductive pathway, i.e., a bus.

Signal propagation in a communication pathway such as a bus physically occurs along an electrically conductive element, for example, a wire trace. As the operating speeds of the computer systems increase, propagation of signals between various devices over the communication pathway must be increasingly well controlled. For example, at relatively slow system clock and bus data transfer rates, signal propagation characteristics remain relatively independent of the conductor length and media discontinuities, and the signal waveform is adequately predicted and described by DC circuit analysis. At low frequencies, signals are fully absorbed (that is, non-reflected) at media discontinuities and terminal ends of the conductor, and do not affect other functional subsystems coupled to the conductor, that is, the bus.

However, as the signal frequency increases, for example, greater than around 30 MHZ or so, transmission characteristics of a bus (for example, minimum cycle time, which in turn determines the maximum bus transfer rate), are no longer independent of the conductor geometry, especially the length, or of the media discontinuities. Two inter-related electrical parameters are of particular importance: propagation delay and settling time. The total delay associated with driving the bus includes the propagation delay through a bus driver and the period of time necessary to have the bus settle. As is known in the art, bus settling time is related, among other parameters, to the time necessary to have reflections, or "ring-back," on the bus die out before the data is received by the intended receiver on the bus, and to the degree of a voltage over-shoot caused by the reflective waves, which over-shoot may occur in both positive and negative directions.

It can be appreciated that the problem of such voltage over-shoots is aggravated especially when certain practical considerations regarding the bus system design come into play. For example, when a bus is optimized to operate at a voltage different from that of a driving device, it is possible to have a pronounced voltage over-shoot on the bus. Also, when the drivers and receivers are optimized to operate at different voltages, as may be the case when modularized components in a system are typically designed to be swappable with a large number of existing replacements on the market, the undesirable effects of voltage overshoots are significantly increased.

As the data transfer rates on a bus increase, it has therefore become necessary to minimize reflections and associated voltage over-shoots on the bus. To reduce the instances of reflected signals that cause data transmission errors in high frequency data communication pathways, line terminators have been developed to match the impedance of the transmission line and thus provide a nonreflecting, that is, absorbing, termination to the transmission line. In this approach, precisely matched line terminators are coupled to terminal ends of transmission lines (that is, bus conductors) so that to the signal the lines appear to be infinite in length, causing the signal to be absorbed fully at the terminal end. Thus, by providing terminators at terminal ends of a bus interconnecting one or more subsystems, reflections on the bus are minimized or precluded altogether, thereby ensuring reliable operation of functional subsystems and devices coupled to the bus.

Several problems are encountered in the foregoing approach to terminating the bus. For example, one problem is that the approach does not specifically address the length-limitation of signal transmission characteristics of a high-performance bus. Further, this approach is not readily or easily applicable in a bus system that is designed to be "non-terminated," that is, a reflecting bus. For example, a recently introduced high-performance system bus, known as the Peripheral Component Interconnect (PCI) bus, is a non-terminated bus that operates, for example, at around 33 MHZ, and may not be more than about 10 inches in length. As can be appreciated, such a constraint restricts a system designer's choice as to how many devices, including expansion slots, can be positioned on the PCI bus. It is known in the art that current PCI bus architectures are designed to support no more than 8–10 loads.

Yet another, related problem arises when a hot-pluggable expansion slot is provided as one of the loads disposed on the bus. Especially, if the expansion slot is to receive an option card or expansion card with drivers designed to operate at a voltage different from the bus voltage or from that of receivers on the bus, resultant voltage over-shoots would give rise to exacerbated effects on the settling time of the non-terminated bus.

Techniques providing in-line, non-terminal termination by way of resistive elements to reduce ring-back in a non-terminated bus have been known for some time. However, such techniques typically involve precise matching of the resistive elements relative to conductor geometry, which renders them platform- and geometry-dependent. Further, they do not address or provide for hot-pluggable expansion slots as loads on the bus. Accordingly, it may be appreciated that there is a need for systems and methods for reducing or preferably eliminating bus ring-back and voltage overshoots in high-performance computer systems with high availability, reliability and serviceability. Moreover, considerably enhanced utility can be found in systems that can allow extra loading on the buses provided therewith. Further, it would be of added benefit if the apparatus for bus ring-back reduction preferably provides additional functionality of facilitating the hot-pluggability aspect of the system.

SUMMARY OF THE INVENTION

The present invention overcomes the abovementioned problems as well as other shortcomings and deficiencies of existing technologies by providing, in one aspect, a computer system that comprises a system board for positioning a first plurality of devices; a bus disposed on the system board, the bus providing a conductive transmission path among the first plurality of devices; an expansion slot disposed on the bus, the expansion slot for receiving and securing an expansion card when the card is presented thereto, the card comprising a second plurality of devices; and a level shifter disposed on the bus, the level shifter for providing a conductive relationship between the bus and the expansion slot, wherein the level shifter operates to reduce voltage over-shoot and ring-back associated with transmission of electrical signals between the system board and the expansion card, the electrical signals being transmitted on the bus.

In yet another aspect, the present invention is directed to a system that comprises: a first processor board, comprising a first set of processors and a first connector; a second processor board, comprising a second set of processors and a second connector; a system board for positioning a plurality of expansion slots, a plurality of devices and at least two processor card receptacles, the system board comprising a processor bus connected to the processor card receptacles, a primary bus for interconnecting a first portion of the plurality of expansion slots and a first portion of the plurality of devices, and a secondary bus for interconnecting a second portion of the plurality of expansion slots and a second portion of said plurality of devices, which primary and secondary buses are electrically coupled to the processor bus through a first bridge and second bridge, respectively; and isolating means for reducing ring-back and voltage over-shoot that are caused when electrical signals are transmitted between one of the plurality of devices and an expansion card that is coupled to one of the expansion slots, and for rendering the expansion slot to which the card is coupled hot-pluggable.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
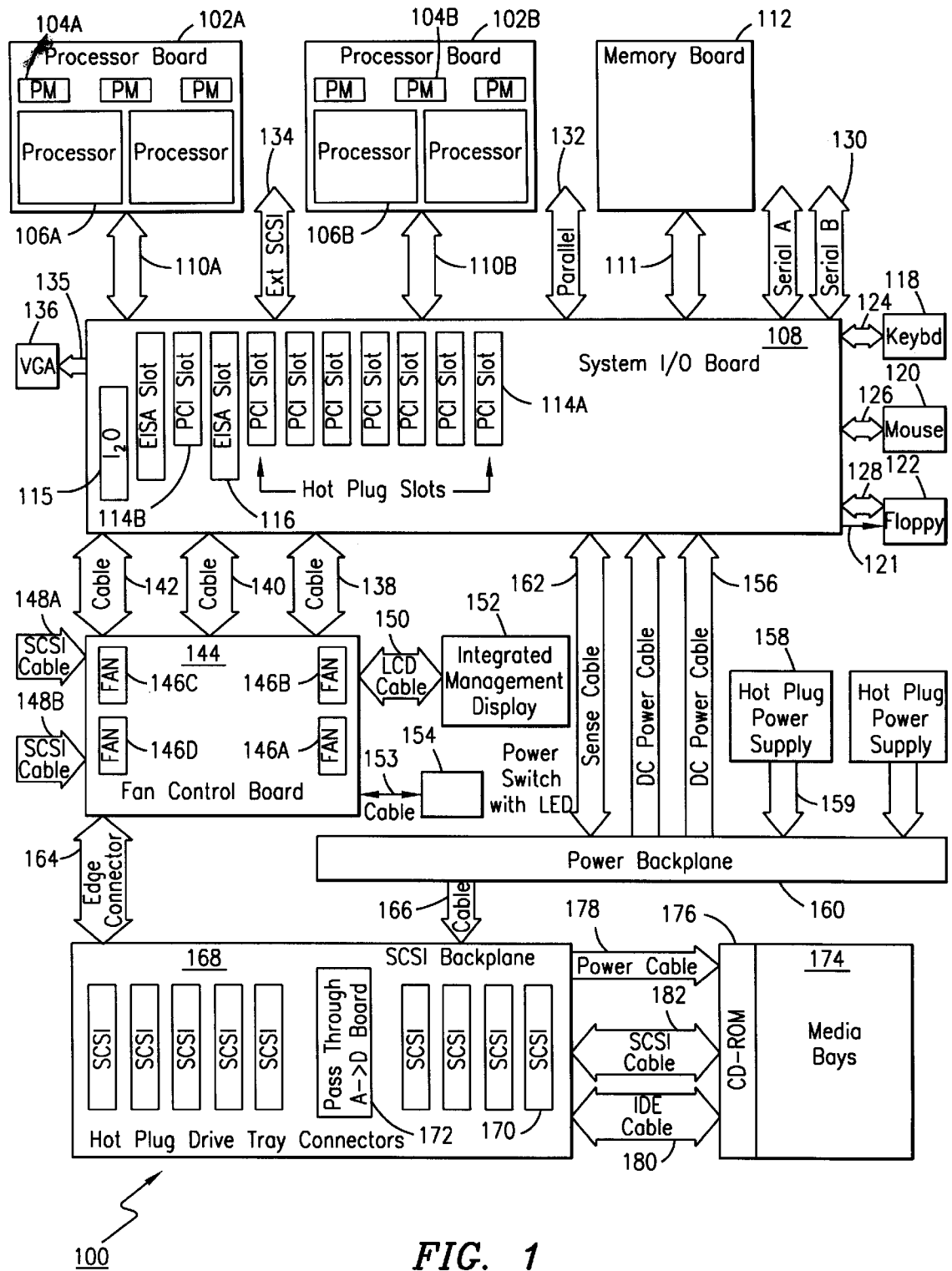
FIG. 1 illustrates a board-level block diagram of a presently preferred exemplary embodiment of a computer system in which the teachings of the present invention may be utilized.

Referring now to the Drawings wherein like or similar elements are designated with identical reference numerals throughout the several views, and wherein the various elements depicted are not necessarily drawn to scale, and, in particular, to FIG. 1, there is shown a board-level block diagram of a presently preferred exemplary computer system 100 in which the teachings of the present invention may be beneficially employed. It should be understood by those skilled in the art that while the exemplary computer system 100 is preferably organized as a "zero downtime," highly available, high-end server system, the present invention may be practiced in virtually all types of computers.

The exemplary computer system 100 may comprise a plurality of processor boards, for example, processor boards 102A and 102B, each of which, in turn, may include at least one processor such as, for example, processors 106A and 106B, respectively. The processor boards 102A and 102B may also include, respectively, a plurality of power modules. For example, power modules 104A and 104B are shown herein.

Each of the processor boards 102A and 102B is connected to a system board 108 via a suitable bus connector or slot, for example, bus connector slots 110A and 110B, respectively. In the exemplary computer system 100, the presently preferred bus connector slots are compatible to be operable with the Gunning Transistor Logic (GTL) bus protocol. Furthermore, as will be seen hereinbelow, the system board 108 in the exemplary embodiment also contains a plurality of input/output (I/O) subsystems. Accordingly, the system board 108 may also be interchangeably referred to as the system I/O board in the following Detailed Description.

Continuing to refer to FIG. 1, a memory board 112 is also coupled to the system board 108 through a memory connection slot 111. In the exemplary computer system 100, the memory board 112 may comprise several dual in-line memory modules (DIMMs) having known and heretofore unknown sizes, for example, 8 MB, 16 MB, 32, MB, 64 MB, 128 MB, and 256 MB. As can be appreciated by those skilled in the art, the memory provided with the memory board 112 may be organized in any fashion.

The exemplary system board 108 comprises a plurality of expansion slots, suitable for different bus types. Further, these expansion slots may be selectively provided with "hot-pluggable" capability. One of ordinary skill in the art can readily appreciate that the ability to replace an expansion card (not shown), receivable at an expansion slot, without powering down the system 100 contributes to rendering the system 100 a "zero downtime" system with high availability. In the exemplary computer system 100, the plurality of expansion slots comprises those that may be operable with the Peripheral Component Interconnect (PCI) bus type (for example, slots 114A and 114B) as well as those slots that are compatible with the Extended Industry Standard Architecture (EISA) bus type (for example, slot 116). It should be appreciated that either categories of the expansion slots may be provided with hot-pluggability. The system board 108 may additionally comprise serial port connections, for example, serial connector 130, parallel port connections, for example, parallel connector 132, and a connector 134 compatible with the Small Computer System Interface (SCSI) bus type.

Still continuing to refer to FIG. 1, the system board 108 is coupled to a host of input and output devices via cables, for example, a keyboard 118 with cable 124, a pointing device 120 with cable 126, a flexible disk drive 122 with cable 128, and a monitor 136 with cable 135. As can be seen, a separate power connection path 121 is also provided between the flexible disk drive 122 and the system board 108.

The exemplary system board 108 may also comprise an "intelligent I/O" bus connector 115 for accelerating the performance of selected PCI-compatible expansion slots. A fan control board 144 is coupled to the system board 108 through a SCSI cable 142, a miscellaneous cable 140 and an Integrated Drive Electronics (IDE) cable 138. The fan control board 144 preferably comprises one or more fan connectors, for example, fan connectors 146A–146D, which fan connectors are used for coupling hot-pluggable fans. The fan control board 144 may be provided with additional SCSI-compatible cables, for example, cables 148A and 148B, a display cable 150 coupled to an Integrated Management Display (IMD) unit 152, and a power switch cable 153 coupled to a power switch 154.

The miscellaneous cable connector 140, which joins the fan control board 144 with the system board 108, preferably contains signals generated by the IMD unit 152, various interlock signals provided by an interlock cabling system (not shown) interconnecting various boards, temperature signals, fan control signals, audio signals et cetera.

The system board 108 of the exemplary computer system 100 is coupled to a power backplane 160 via a sense cable 162 and at least one DC power cable 156. At least one hot plug power supply unit 158 is connected to the power backplane 160 through a hot plug power connector 159. Both the fan control board 144 and the power backplane 160 are coupled to a SCSI backplane 168 via an edge connector 164 and a power-SCSI backplane cable 166, respectively. The SCSI backplane comprises one or more SCSI drive tray connectors, for example, tray connector 170. In the exemplary computer system 100, the SCSI drive tray connectors are also provided with the hot plug capability in order to enhance the high availability aspect thereof. A media power cable 178 connects the SCSI backplane 168 to a media bay 174 and CD-ROM drive 176. A media SCSI cable 182 and an IDE cable 180 are also disposed between the SCSI backplane 168 and the CD-ROM/media bay 176/174.

Figure 2:
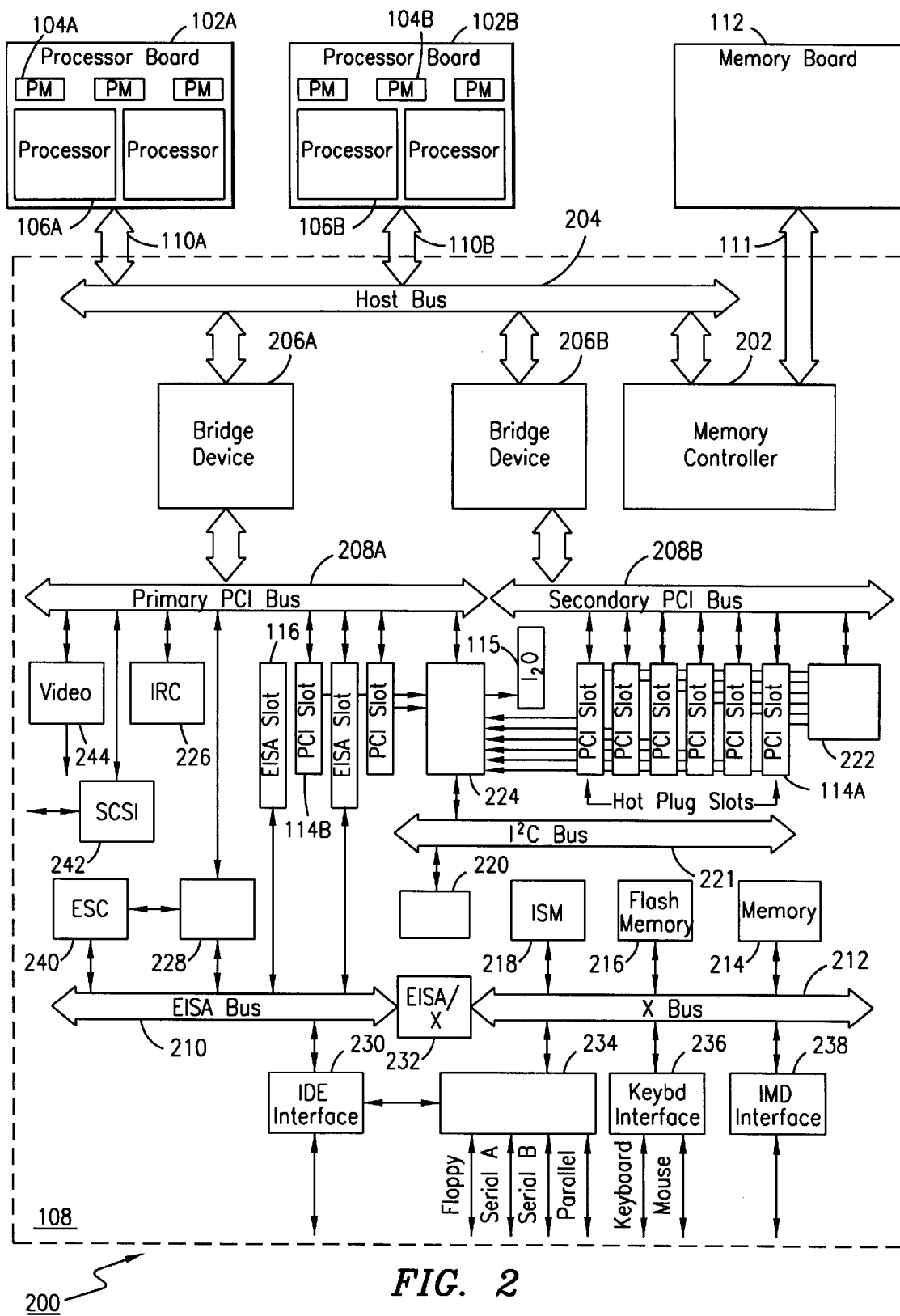
FIG. 2 depicts a device-level block diagram of a system board used in the presently preferred exemplary embodiment of the computer system wherein the teachings of the present invention are advantageously utilized.

Referring now to FIG. 2, there is shown a device-level block diagram 200 of the system I/O board 108 provided in the exemplary computer system 100, wherein the teachings of the present invention may be practiced. As described in the foregoing with reference to FIG. 1, the processor boards 102A and 102B are connected to the system board 108 via bus connector slots 110A and 110B, respectively. The bus connector slots 110A and 110B are, in turn, coupled to a host bus 204 disposed on the system board 108. In the preferred exemplary embodiment, the host bus 204 uses the Gunning Transistor Logic protocol for enabling high-speed, low-power operation. As is known in the art, the GTL voltage swings between logic high and logic low are typically lower than those for the Complementary Metal Oxide Semiconductor (CMOS) logic or the Transistor-Transistor Logic (TTL). In addition to the bus connector slots 110A and 110B, the following exemplary devices are disposed on the host bus 204: a memory controller 202, a first bus-to-bus bridge 206A and a second bus-to-bus bridge 206B. The bridge 206A is provided for bridging between the host bus 204 and a primary PCI bus 208A, whereas the bridge 206B is provided for bridging between the host bus 204 and a secondary PCI bus 208B. Coupled to the memory controller 202 is the memory board 112 via the memory board connection slot 111.

In addition to the bridge device 206A for coupling to the host bus 204, the primary PCI bus 208A is connected to the following exemplary devices: a video controller 244, a PCI-EISA bridge 228, a SCSI controller 242, an Integrated Remote Console (IRC) controller 226, an application specific device 224, and at least one expansion slot 114B.

In a presently preferred exemplary embodiment of the computer system 100, the IRC controller 226 is provided as a "hidden" device that resides on the primary PCI bus 208A. The presently preferred functionality of the IRC controller 226 performs, inter alia, as follows: it examines and records video activity that is passed to firmware through the System Management Interrupt (SMI). It also allows a remote user to reboot or power-cycle the computer system 100. Further, the IRC controller 226 provides for remote modification such that a remote user can modify any IRC configuration or user setting, preferably after proper authentication.

The device 224 is preferably provided as an application specific integrated circuit (ASIC) that operates as a latching system for signals that indicate the health and operability of various devices and system within the exemplary computer system 100. Its functionality preferably includes, for example, bus arbitration, Inter-Integrated Circuit ($I^2C$) bus master controller function, bus utilization monitoring, semaphore logic and timer functions. It can be seen that the device 224 is coupled to an $I^2C$ bus 221 and the intelligent I/O bus connector 115 in order to facilitate some of these functions.

Continuing to refer to FIG. 2, the secondary PCI bus 208B is coupled to a plurality of expansion slots, for example, slot 114A, which are preferably provided with the hot plug capability. An application specific device 222 is also coupled to the secondary PCI bus 208B to provide hot plug slot control and PCI bus arbitration.

The $I^2C$ bus 221, for which bus the device 224 provides the master controller functionality, is preferably coupled to a plurality of memory devices although only one such device, for example, EEPROM 220, is shown. In addition, in the preferred exemplary computer system 100, the $I^2C$ bus 221 goes to a sense connector (not shown), the processor board bus connector slots 110A and 110B, and the memory board connector slot 111.

The PCI-EISA bridge 228, disposed between an EISA bus 210 and the primary PCI bus 208A, preferably includes, for example, a PCI interface, PCI arbiter, EISA interface, EISA data swap logic, and an interface to an EISA System Component (ESC) 240. In the exemplary embodiment, the ESC 240 preferably includes an EISA bus controller, a Direct Memory Access (DMA) controller, an EISA arbiter, at least one interrupt controller which may be programmable, several timers and support logic.

In addition to the expansion slots, for example, slot 116, the EISA bus 210 is connected to the ESC 240, a bridge 232 to an 8-bit buffered EISA bus 212 (also referred to as the X bus), and an IDE interface 230. The X bus is typically used by devices that have low output drive, and cannot sink the typical current (at around 24 mA) required by the standard EISA bus type. In the exemplary computer system 100, the following devices are typically provided on the X bus 212: a flash memory 216 for storing system BIOS and system management BIOS codes, an IMD interface 238, a memory 214 (preferably provided as nonvolatile RAM), an Integrated System Management (ISM) device 218, a keyboard controller 236 for interfacing the keyboard 118 and pointing device 120 (both depicted in FIG. 1), and a peripheral controller 234 (preferably provided as an ASIC) for controlling such devices as flexible disk drives, parallel ports, and serial ports. It can be seen that the peripheral controller 234 is preferably coupled to the IDE interface 230 in addition to the X bus 212.

Figure 3A:
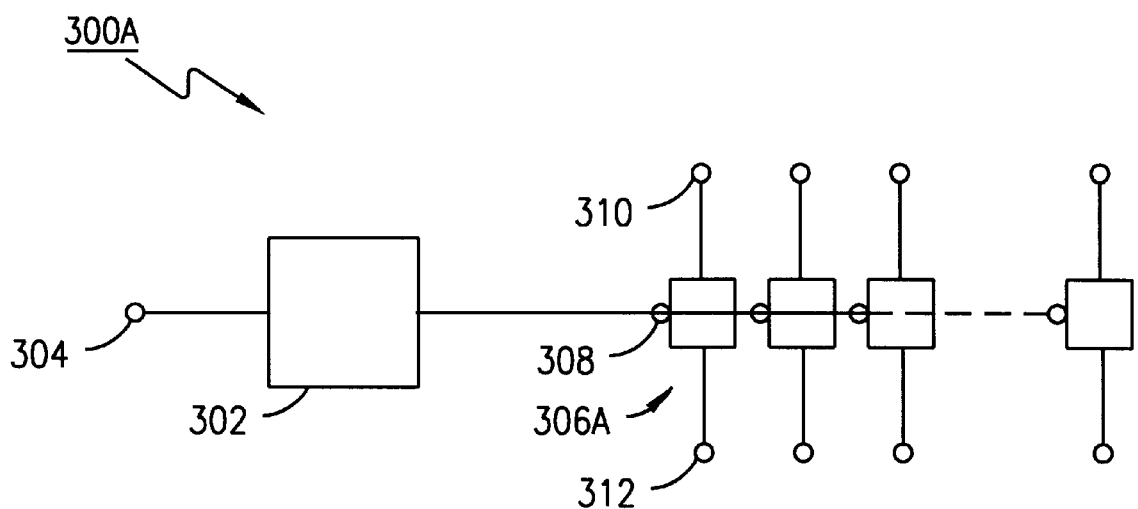
FIG. 3A illustrates a block diagram of an exemplary embodiment of a switching and isolating device for utilizing the teachings of the present invention.

Referring now to FIG. 3A, shown therein is a block diagram of an exemplary embodiment of a switching and isolating device 300A which preferably operates as a "level shifter" for providing reduction in bus ring-back and voltage over-shoot in addition to facilitating hot-pluggability in an expansion slot. The device 300A comprises a logic gate device 302 and at least a switch 306A coupled thereto. The switch 306A comprises a control node 308, an input node 310 and an output node 312. When the switch 306A is in the OFF position, the input node 310 and output node 312 are typically electrically isolated.

The logic gate device 302 is connected to the control node 308. The input and output nodes 310, 312, respectively, may be connected in series to a transmission line. The logic gate device 302 operates to produce a control signal responsive to an input signal received at its node 304, which control signal is applied to the control node 308 of the switch 306A. The switch 306A is thereby enabled (that is, switched to the ON position) to establish preferably a low ohmic conductive path between the input node 310 and the output node 312.

It can be seen in FIG. 3A that a plurality of switches may be employed in the device 300A, which may be organized in banks such that a separate logic gate device controls each of the banks. As can be appreciated by those skilled in the art, the device 300A with multiple switches may be disposed on a communication path such as, for example, a bus (not shown), for selectively enabling signal conduction thereon.

Figure 3B:
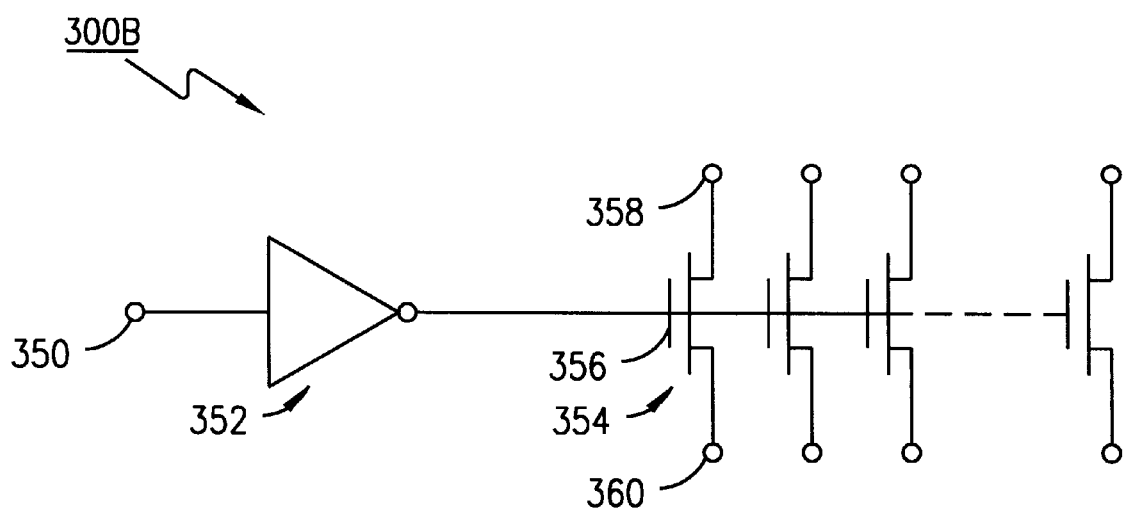
FIG. 3B illustrates a block diagram of another exemplary embodiment of the switching and isolating device for utilizing the teachings of the present invention.

Referring now to FIG. 3B, another exemplary embodiment of the switching and isolating device 300B is shown in a block diagram. It can be seen that each switch 354 comprises an N-channel Metal Oxide Semiconductor (MOS) transistor driven by an inverter 352. When the switch 354 is enabled, the gate node 356 thereof is typically at about 5.0V and a conductive path having a resistance of typically around 5 ohms is established between the input node 358 and output node 360. In the ON position, the switch 354 may typically drive in excess of around 65 mA.

As can be appreciated by those skilled in the art, the control signal produced by the inverter 352 responsive to the input signal received at node 350 gives rise to the selective switching and isolating operation of the switch 354. Further, by effecting the operation of the switch in a voltage region known in the art as the "pinch-off" region, the amount of current available to drive the voltage at the output node 360 can be limited. Accordingly, the voltage at the output node 360 will be typically limited to around 3.3V regardless of the excess voltage level applied at the input node 358 beyond the pinch-off voltage. As is described hereinbelow, this electrical property can be advantageously utilized in a bus ring-back and voltage over-shoot reduction.

Figure 4A:
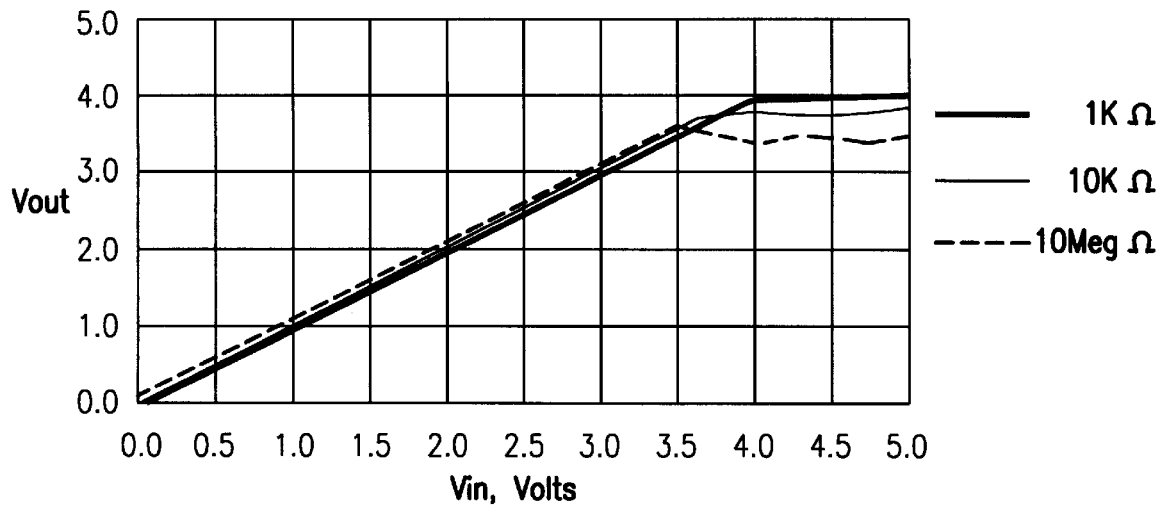
FIG. 4A and 4B depict electrical relationships in an exemplary switching and isolating device.
Figure 4B:
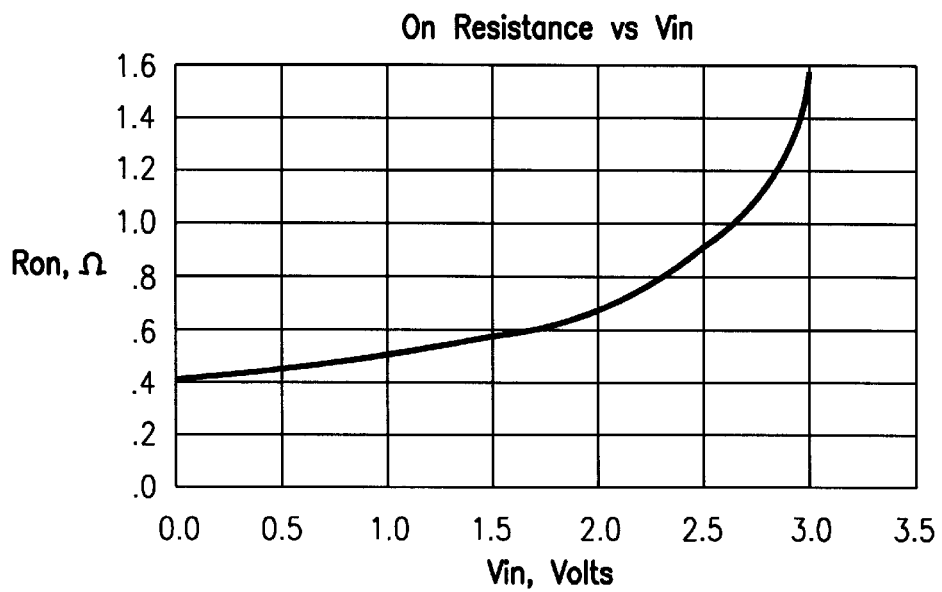

It should be appreciated that a switching and isolating device such as, for example, the device 300B, provides a low resistive connection between inputs and outputs for voltages typically below at around 3.0V. As the I/O voltage rises above 3.0V, the resistance increases until the device turns off. The ON resistance of the device is typically determined by the lower of the voltages on the I/O nodes, as the directionality of the inputs and outputs can be interchanged in a bidirectional communication path. The ON resistance rises as the I/O voltage rises. These electrical relationships are shown in FIGS. 4A and 4B.

A combined switching and isolating device such as, for example, those described hereinabove can be employed in a computer system (for example, the system 100 shown in FIG. 1) for bus ring-back and voltage over-shoot reduction. Moreover, the same apparatus can also be employed for providing a hot-pluggable expansion slot disposed on the bus. It should be appreciated that integrating these desirable functionalities preferably into a single apparatus reduces the total count of components of a system, thereby improving its reliability and serviceability.

Figure 5:
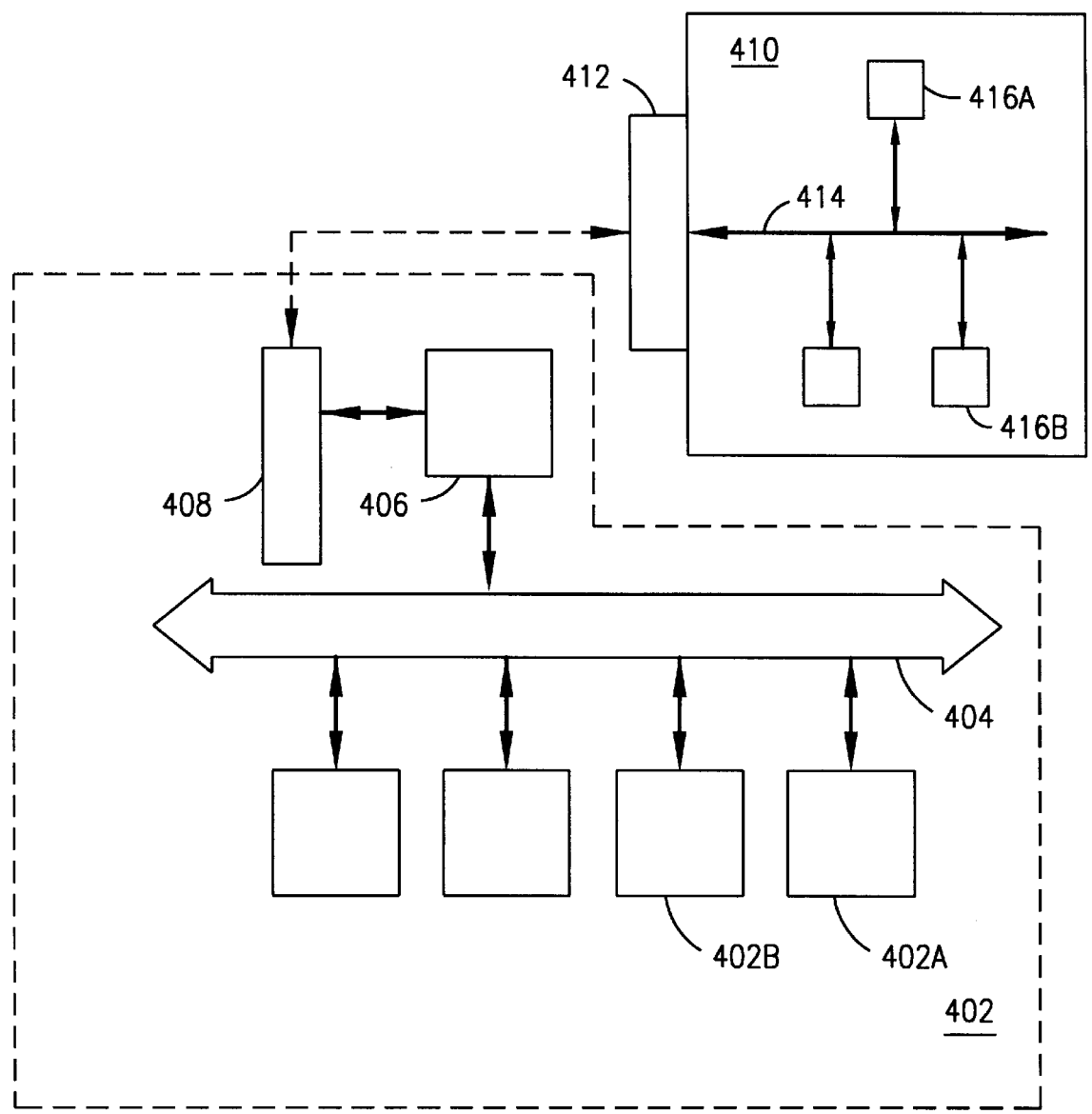
FIG. 5 depicts a block diagram of an exemplary embodiment of the present invention utilizing the isolating and switching device in accordance with the teachings hereof.

Referring now to FIG. 5, there is shown a block diagram of an exemplary embodiment of the present invention utilizing an isolating and switching device in an exemplary system, such as the computer system 100 in accordance with the teachings hereof. Reference numeral 402 refers to a portion of a board such as, for example, the system board 108, shown in FIG. 2. A portion of a bus, portion 404, is disposed on the board portion 402, which bus portion is preferably provided for effectuating a communication path among a first plurality of devices, for example, devices 402A and 402B. An expansion card 410 comprising a second plurality of devices, for example, devices 416A and 416B. It should be understood that devices 416A and 416B are interconnected together with a conductive portion 414, which conductive portion is operably compatible with the bus portion 404. A connector 412, associated with the expansion card 410, is electrically connected to a terminal of the conductive portion 414. A switching and isolating block 406, which may comprise such exemplary devices as devices 300A or 300B in any variation, combination or organization, is preferably connected to the bus portion 404 and an expansion slot 408 such that electrical signals between the card 410 and the board portion 402 are passed therethrough.

In a hot-plug situation, the card 410 is plugged into the expansion slot 408 while the system is running. The card connector 412 may be preferably designed so that the ground pins (not shown) contact first, followed by various signal pins and one or more power pins. When the signal pins are connected to the bus portion 402 via the slot 408, the circuitry comprising the devices 416A and 416B will be initially unpowered. In this "no power" condition, it is preferred that these card devices will not disturb the bus portion 404, that is, they draw no current therefrom.

It is also preferred for hot-plugging that the card 410 should not disturb the bus portion 404 while it is being powered up. This means that the logic associated with the on-card devices must be OFF as the power on the card 410 transitions from zero to its nominal value, which will typically take several microseconds. If any on-card initialization or built-in-self-test (BIST) is required after power up, this activity must preferably be isolated from the bus portion 404 until the expansion card 410 is ready for operation.

One solution to the hot-plug isolation problem is to implement a layer of hot-plug rated buffers and transceivers between the card connector 412 and the bus portion 404. It should be understood that such techniques typically introduce additional propagation delay and may require extra control circuitry for determining the directionality of the signals.

The switching and isolation block 406 of the present invention serves as a solid state relay to connect the on-card devices to the bus portion 404 when it is appropriate. As described in the foregoing, when the block 406 is ON, it connects the bus portion 404 with the conductive portion 414 on the card 410 with a low ohmic conductive path. Thus, when ON, the block 406 acts analogous to a wire. Like a wire, it introduces negligible delay in the data path and is inherently bidirectional. When the block 406 is OFF, it presents a low capacitive load with no diode leakage. Accordingly, when in the OFF position, the block 406 preferably does not draw current from the bus portion 404.

Further, as described in the foregoing in reference to FIGS. 3A and 3B, the output voltage level remains substantially constant at around 3.3V, irrespective of the input voltage level beyond the pinch-off region. Therefore, because of the level shifting, voltage swings associated with signal reflections and over-shoots are reduced more quickly to a desirable level. Accordingly, for example, when a 5.0V master device drives the bus portion 404, the signal reflections and voltage over-shoot caused thereby are "clamped" to an appropriate level, especially when the bus portion 404 or the receiver devices are optimized for operation at around 3.3V or so. As can be appreciated, this result improves signal quality, reduces bus settling time and makes it possible to put additional loads on the bus portion 404. Favorable results have been obtained with six hot-pluggable expansion slots (equivalent of 12 loads) and 3 devices, giving rise to a total of 15 loads on the bus portion 404.

Based upon the foregoing, it should now become apparent to those skilled in the art that the switching and isolation devices which preferably operate as level shifters and provided in accordance with the teachings of the present invention significantly enhance the high availability, reliability and serviceability aspects of various computer systems. It should be appreciated that the present invention provides a simple yet highly effective solution to the problem of bus ring-back and voltage over-shoots in a high-performance system. Moreover, the presently preferred exemplary embodiment of the present invention also provides hot-pluggability in order to render the system more serviceable with minimized downtime.

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A computer system, comprising:

a system board for positioning a first plurality of devices;

a bus disposed on said system board, said bus for providing a conductive transmission path among said first plurality of devices;

an expansion slot disposed on said bus, said expansion slot for receiving and securing an expansion card when said card is presented thereto, said card comprising a second plurality of devices; and a single circuit structure with combined switching and isolating functionality disposed between said expansion slot and said expansion card, said single circuit structure selectably operable to reduce bus ring-back produced when signals are propagated on said bus at a high speed, wherein said bus comprises a high-frequency bus.

2. The computer system as recited in claim 1, wherein said single circuit structure comprises:

at least one switch having a control node, an input node and an output node; and a logic gate device coupled to said control node of said at least one switch, said logic gate device operating to produce a control signal, wherein when said control signal is generated and applied to said control node of said at least one switch, said at least one switch is turned on, thereby establishing a low ohmic conductive path between said input node and said output node.

3. The computer system as recited in claim 2, wherein said logic gate device comprises an inverter.

4. The computer system as recited in claim 1, wherein at least one of said first plurality of devices operates at around 3.3 volts.

5. The computer system as recited in claim 1, wherein at least one of said second plurality of devices operates at around 5.0 volts.

6. The computer system as recited in claim 1, wherein said bus comprises a Peripheral Component Interconnect (PCI) bus operating substantially at 33 Megahertz.

7. The computer system as recited in claim 1, wherein said bus comprises a PCI bus operating substantially at 66 Megahertz.

8. The computer system as recited in claim 1, wherein said expansion card is hot-pluggable.

9. A system, comprising:

a first processor board, comprising a first set of processors and a first connector;

a second processor board, comprising a second set of processors and a second connector;

a system board for positioning a plurality of expansion slots, a plurality of devices and at least two processor card receptacles, said system board comprising a processor bus connected to said at least two processor card receptacles, a primary bus for interconnecting a first portion of said plurality of expansion slots and a first portion of said plurality of devices, and a secondary bus for interconnecting a second portion of said plurality of expansion slots and a second portion of said plurality of devices, which primary and secondary buses are electrically coupled to said processor bus through a first bridge and second bridge, respectively; and single structure isolating means for reducing ring-back that is specifically caused when electrical signals are transmitted between one of said plurality of devices and an expansion card that is coupled to one of said expansion slots via a high-frequency, non-terminated bus disposed therebetween, and for rendering said expansion slot to which said card is coupled hot-pluggable.

10. The system as recited in claim 9, wherein said isolating means comprises at least a transistor having a gate node, an input node and output node, and logic means for generating a gate control signal, and further wherein when said gate control signal is applied to said gate node, a low ohmic conductive path is established between said input node and said output node.

11. The system as recited in claim 10, wherein said logic means comprises an inverter.

12. The system as recited in claim 10, wherein said at least a transistor comprises an n-channel field effect transistor (FET).

* * * * *